United States Patent
Reynolds

(10) Patent No.: US 9,830,147 B1
(45) Date of Patent: Nov. 28, 2017

(54) REMOTE PROCEDURE CALLS IN A REPLICATED SERVER SYSTEM

(71) Applicant: GitHub, Inc., San Francisco, CA (US)

(72) Inventor: Patrick Reynolds, Pensacola, FL (US)

(73) Assignee: GitHub, Inc., San Francisco, CA (US)

(*) Notice: Subject to any disclaimer, the term of this patent is extended or adjusted under 35 U.S.C. 154(b) by 168 days.

(21) Appl. No.: 14/757,906

(22) Filed: Dec. 23, 2015

(51) Int. Cl.
*G06F 9/45* (2006.01)
*G06F 9/44* (2006.01)
*H04L 29/08* (2006.01)
*G06F 9/54* (2006.01)

(52) U.S. Cl.
CPC ............... *G06F 8/71* (2013.01); *G06F 9/547* (2013.01); *H04L 67/1095* (2013.01)

(58) Field of Classification Search
CPC .............. G06Q 10/06; G06F 8/20; G06F 8/71
USPC ........................................................ 717/101
See application file for complete search history.

(56) References Cited

U.S. PATENT DOCUMENTS 7,237,002 B1* 6/2007 Estrada ............. G06F 17/30873
707/999.01

OTHER PUBLICATIONS

Jan et al., A Robust Authentication Scheme for Observing Resources . . . , 2014, IEEE, p. 205-211.*

* cited by examiner

*Primary Examiner* — John Chavis
(74) *Attorney, Agent, or Firm* — Van Pelt, Yi & James LLP

(57) ABSTRACT

A system for command handling for replicated repositories includes an input interface and a processor. The input interface is to receive a command. The processor is to determine a set of servers to receive the command, determine whether responses match for the command for each server of the set of server, and in the event the responses do not match, determine whether the responses are required to match for the command and in the event the responses are not required to match for the command, determine a unified response.

22 Claims, 8 Drawing Sheets

US 9,830,147 B1

REMOTE PROCEDURE CALLS IN A REPLICATED SERVER SYSTEM

BACKGROUND OF THE INVENTION

A system for storing software comprises an online software repository hosting code for software developers. The online software repository assists with project sharing, collaboration, version control, etc. As the system is used by an increasingly large number of software developers, the system may add a plurality of additional online software repository servers to distribute the load. When a developer desires to communicate with the online software repository (e.g., read data, write data, perform system commands, etc.), the developer system needs to determine the most appropriate way to communicate with the plurality of servers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for command handling for replicated repositories comprises an input interface to receive a command and a processor to determine a set of servers to receive the command, determine whether responses match for the command for each server of the set of servers, and in the event the responses do not match, determine whether the responses are required to match for the command, and in the event the responses are not required to match for the command, determine a unified response. In some embodiments, the system for command handling for replicated repositories additionally comprises a memory coupled to the processor and configured to provide the processor with instructions.

Figure 1:
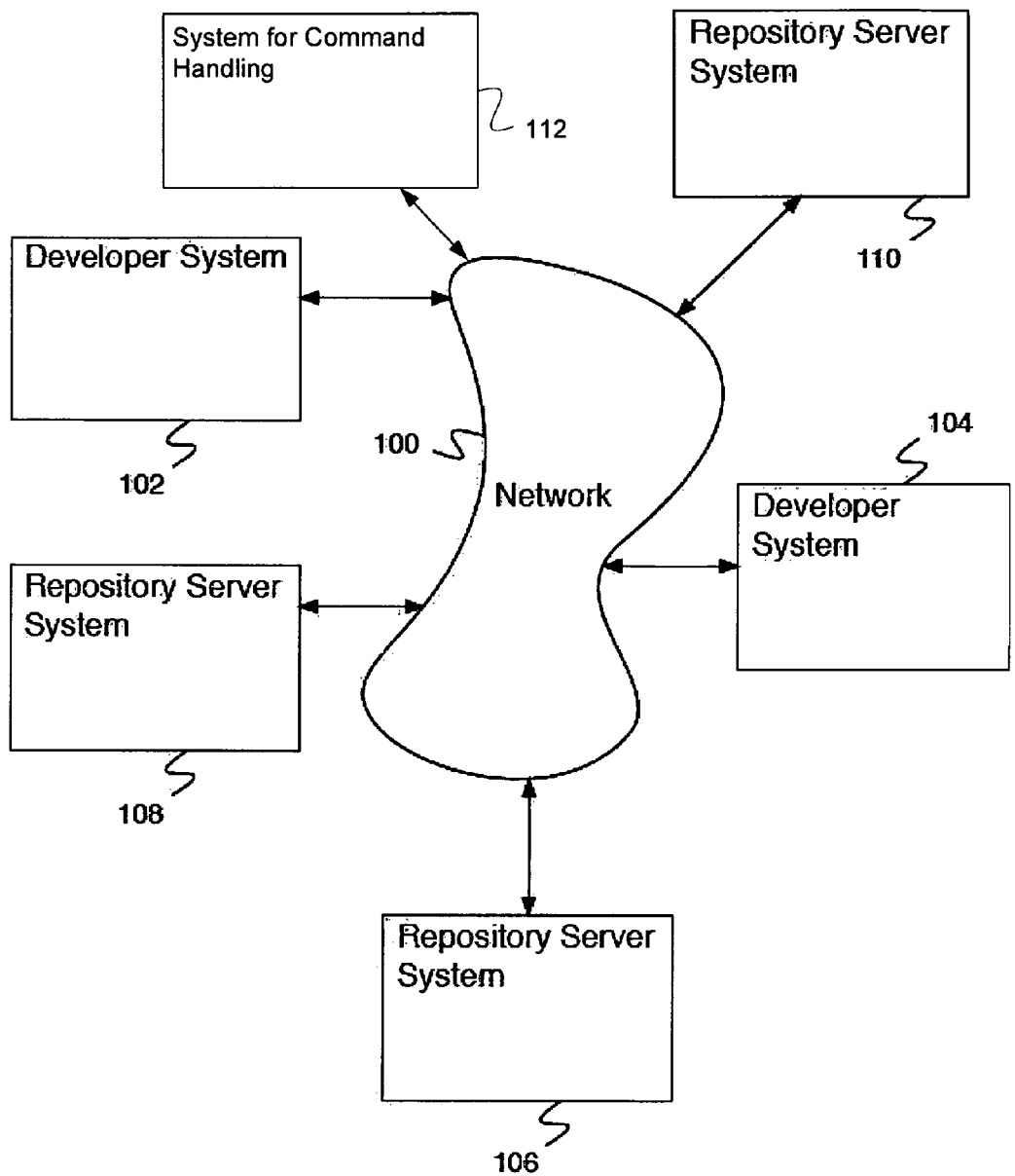
FIG. 1 is a block diagram illustrating an embodiment of a network system.

FIG. 1 is a block diagram illustrating an embodiment of a network system. In some embodiments, the network system of FIG. 1 comprises a system for revision control. In some embodiments, the network system of FIG. 1 provides communication between any appropriate number of software developers and a set of repository server systems. In the example shown, FIG. 1 comprises network 100. In various embodiments, network 100 comprises one or more AA the following: a local area network, a wide area network, a wired network, a wireless network, the Internet, an intranet, a storage area network, or any other appropriate communication network. In the example shown, developer system 102 and developer system 104 comprise systems for use by a software developer while developing software. In various embodiments, there are 1, 6, 22, 122, 1059, or any other appropriate number of developer systems communicating with network 100. In some embodiments, a developer system comprises a processor and a memory. Repository server system 106, repository server system 108, and repository server system 110 comprise server systems for storing data. In various embodiments, there are 1, 2, 3, 4, 5, 7, 9, 14, 22, or any other appropriate number of repository server systems. In some embodiments, a repository server system comprises a processor and a memory. In some embodiments, repository server system 106, repository server system 108, and repository server system 110 comprise server systems for storing code. In various embodiments, repository server system 106, repository server system 108, and repository server system 110 comprise systems for storing software, for enabling collaboration, for providing version control, for publishing software, or for any other appropriate purpose. In some embodiments, a developer system downloads a software repository from a repository server system. In some embodiments, a developer system uploads software modifications to a software repository on a repository server system. In some embodiments, each repository system stores the same software. In the example shown, system for command handling 112 comprises a system for receiving a request to communicate with a repository server and determining one or more repository servers to communicate with. In various embodiments, system for command handling 112 comprises a system for receiving a set of responses from a set of repository servers, a system for determining whether a set of responses is required to match, a system for determining a command success, a system for determining a command failure, a system for determining a unified response, or a system for any other appropriate command handling purpose. In some embodiments, system for command handling 112 comprises a command table for storing command-specific information (e.g., a set or a number of servers to receive the command, a process for determining a unified response for the command, a matching threshold for the command, etc.). In some embodiments, system for command handling 112 is implemented using a processor.

Figure 2:
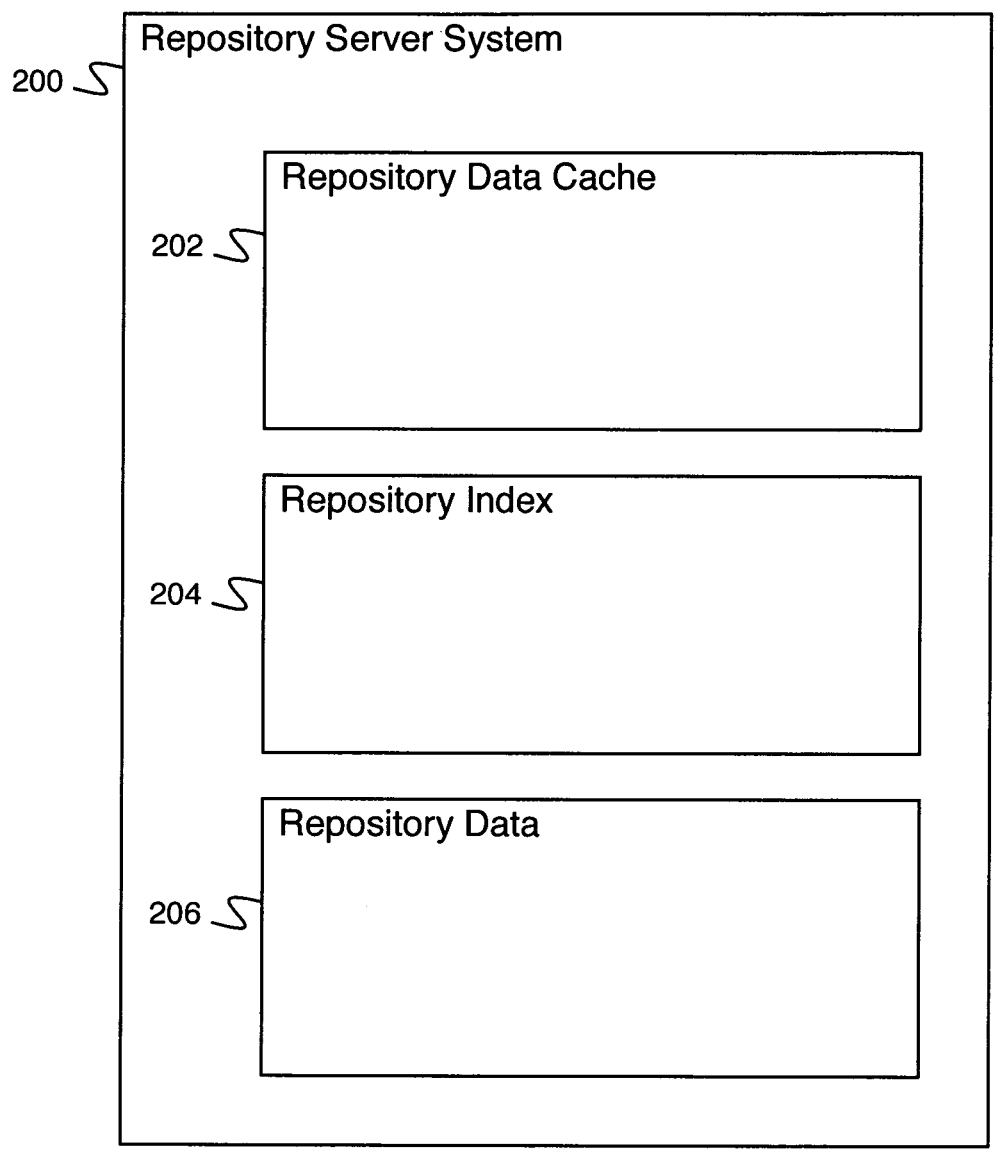
FIG. 2 is a block diagram illustrating an embodiment of a repository server system.

FIG. 2 is a block diagram illustrating an embodiment of a repository server system. In various embodiments, repository system 200 of FIG. 2 comprises repository server system 106 of FIG. 1, repository server system 108 of FIG. 1, or repository server system 110 of FIG. 1. In the example shown, repository server system 200 comprises repository data cache 202. In some embodiments, repository data cache 202 comprises a data cache for storing recently requested data. In some embodiments, repository data cache 202 is stored in random-access memory. In some embodiments, when data is requested from repository server system 200, repository server system 200 checks repository data 202 cache to see whether the data is stored there. In the event the data is stored in repository data cache 202, the data is provided from repository data cache 202 to the data requestor. In the event the data is not stored in repository data cache 202, the data is requested from repository index 204. Repository index 204 comprises an index of repositories stored by repository server system 200. Each repository comprises a set of data chunks. Locations of the data chunks within repository data 206 are stored by repository index 204. When data is requested from repository index 204, it determines the data chunk or chunks comprising the requested data, requests the data chunk or chunks from repository data 206, assembles the requested data, and provides the data to the data requestor. In some embodiments, repository data 206 comprises a disk memory. In some embodiments, the requested data is additionally stored in repository data cache 202 in order to speed data access the next time the data is requested. In some embodiments, in the event repository data cache is full, data is discarded from repository data cache 202 to make room for the new data. In various embodiments, the oldest data is discarded, the least recently used data is discarded, the least used data is discarded, or any other appropriate data is discarded. In some embodiments, repository data cache 202 is implemented using a processor. In some embodiments, repository index 204 is implemented using a processor. In some embodiments, repository data 206 is implemented using a processor. In various embodiments, the elements of repository server system are each implemented using their own processor, are all implemented using a single processor, or are implemented combined on a set of processors in any other appropriate way. In some embodiments, repository server system 200 additionally comprises an interface for communicating (e.g., with a network, e.g., network 100 of FIG. 1). In some embodiments, repository server system 200 additionally comprises a memory. In some embodiments, the memory is coupled to a processor and configured to provide a processor with instructions. In various embodiments, the memory comprises a magnetic memory, an optical memory, a solid-state memory, a flash memory, a non-volatile memory, a read-only memory, a tape memory, a disc memory, or any other appropriate memory.

Figure 3:
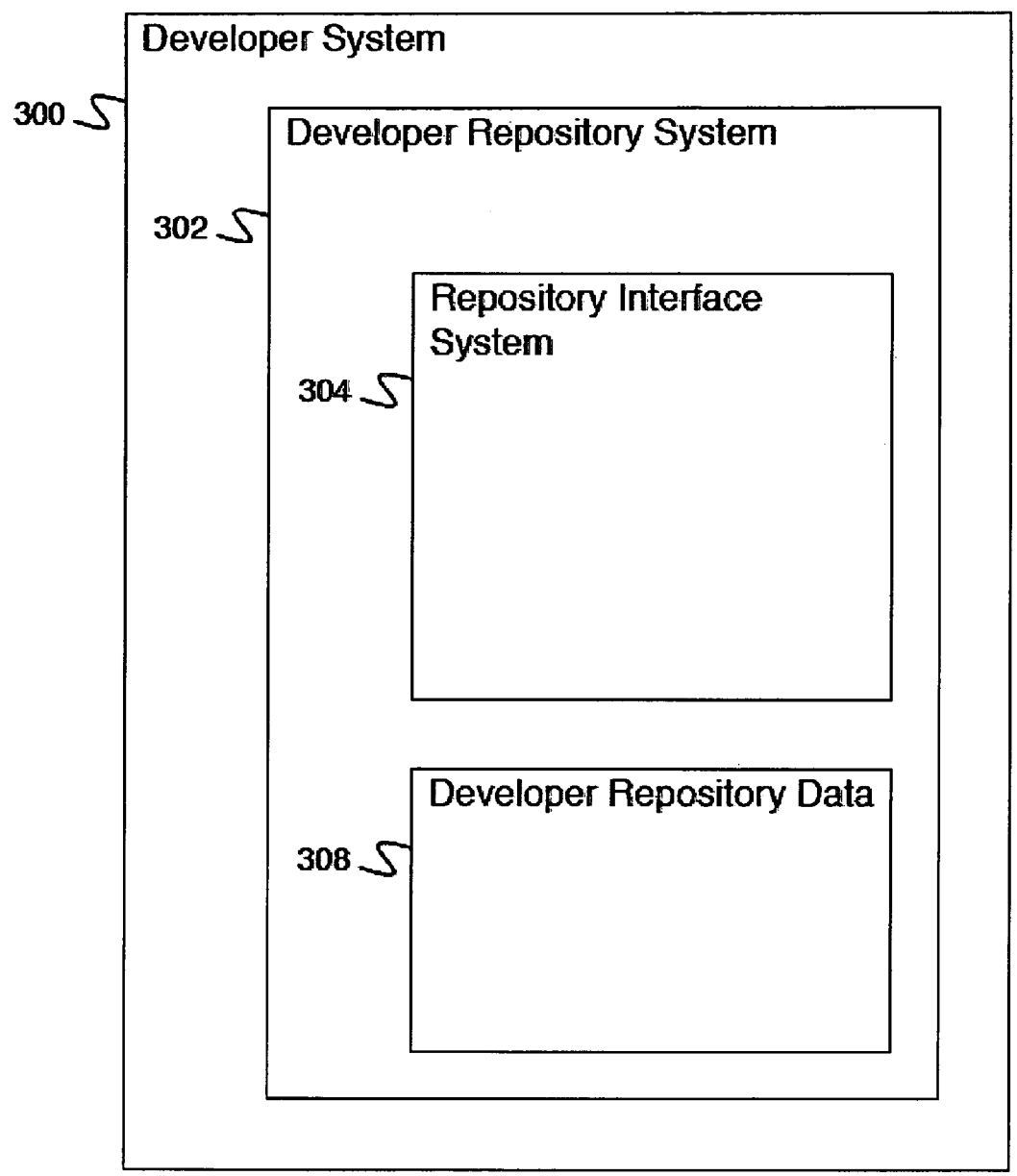
FIG. 3 is a block diagram illustrating an embodiment of a developer system.

FIG. 3 is a block diagram illustrating an embodiment of a developer system. In some embodiments, developer system 300 comprises developer system 102 of FIG. 1 or developer system 104 of FIG. 1. In the example shown, developer system 300 comprises a system for a developer for working with software. Developer system 300 comprises developer repository system 302. Developer repository system 302 comprises a system for a developer to work with repository data. In various embodiments, developer repository system 302 comprises a system for downloading data from a repository server, for storing changes to data, for uploading changes to data, for merging changes to data, for storing a local copy of a software repository, or for any other appropriate purpose. In some embodiments, developer system 300 additionally comprises developer tools (e.g., software compilers, software development environment tools, software development research tools, debugging tools, software measurement tools, etc.). In the example shown, developer repository system 302 comprises repository interface system 304 and developer repository data 308. In some embodiments, developer repository data 308 comprises repository data (e.g., a local copy of repository data, developer changes to repository data, etc.). Repository interface system 304 comprises a system for communicating with one or more repository servers. In various embodiments, repository interface system 304 comprises a system for downloading repository data, for uploading repository data, for executing repository system commands, or for any other appropriate repository interface purpose. In the example shown, repository interface system 304 is used to communicate with a system for command handling (e.g., system for command handling 112 of FIG. 1). In some embodiments, repository interface system 304 is implemented using a processor. In some embodiments, developer repository data 308 is implemented using a processor. In some embodiments, developer repository system 302 is implemented using a processor. In various embodiments, the elements of developer system 300 are implemented on any appropriate number of processors, combined in any appropriate way. In some embodiments, developer system 300 additionally comprises an interface for communicating (e.g., with a network, e.g., network 100 of FIG. 1). In some embodiments, repository server system 300 additionally comprises a memory. In some embodiments, the memory is coupled to a processor and configured to provide a processor with instructions. In various embodiments, the memory comprises a magnetic memory, an optical memory, a solid-state memory, a flash memory, a non-volatile memory, a read-only memory, a tape memory, a disc memory, or any other appropriate memory.

Figure 4:
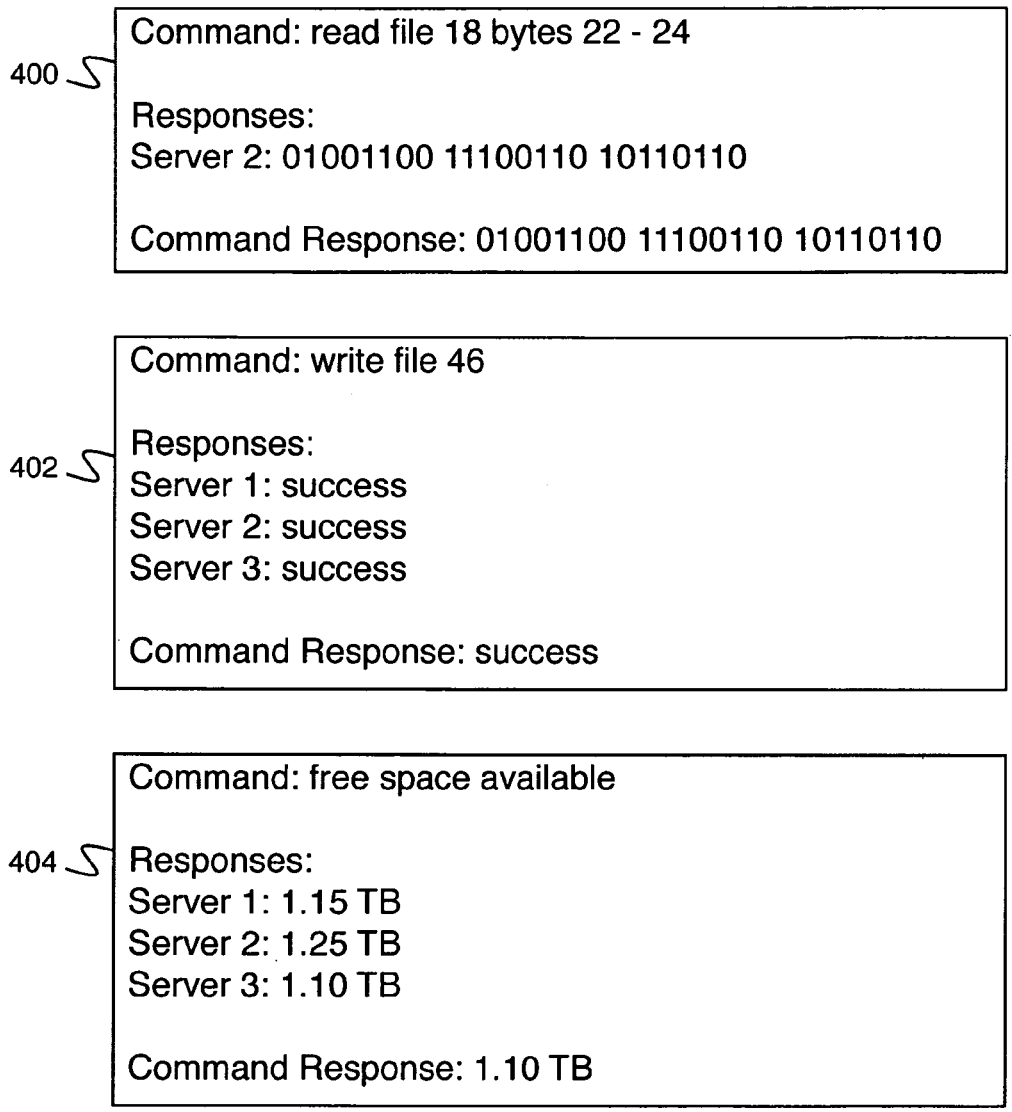
FIG. 4 is a diagram illustrating an embodiment of a set of example software repository server commands and responses.

FIG. 4 is a diagram illustrating an embodiment of a set of example software repository server commands and responses. In some embodiments, the example commands of FIG. 4 are provided by a system for command handling (e.g., system for command handling 112 of FIG. 1) to one or more repository server systems (e.g., repository server system 106 of FIG. 1, repository server system 108 of FIG. 1, or repository server system 110 of FIG. 1). In some embodiments, the system for command handling receives the command of each example, determines one or more repository systems to provide the command to, receives a set of responses, and determines a command response based on the set of responses. In the example shown, the software command of example 400 comprises a read command (e.g., "read file 18 bytes 22-24") indicating to read an indicated set of data. Each repository server system comprises the same data, so they each are able to provide the same response. In some embodiments, the system for command handling determines a single repository server system for the read. In various embodiments, the system for command handling determines a repository system using a random decision, using a round-robin decision, based on a server load, or in any other appropriate way. In the example shown, the command is provided to server 2 (e.g., the second server of a set of servers). A read response is received from server 2 comprising the requested data. In the example shown, the command response to the read command is determined to be the read response from the determined server.

In the example shown, the software command of example 402 comprises a write command (e.g., "write file 46") indicating to write a specified file. In order to maintain each software repository system with the same data, the file write needs to be performed on all repository server systems. In some embodiments, the system for command handling determines to provide the write command to all repository server systems. A write response is received from each repository server system. In the example shown, a write response of success is received from each repository server system. The write response from each repository server system is combined to determine a command response to the write command. In the example shown, the command response is determined to be success.

In the example shown, the software command of example 404 comprises a free space available command indicating to determine the free space available on the repository server system. In some embodiments, a free space available command requires determining a free space available on each repository server system. In some embodiments, the system for command handling determines to provide the free space available command to all repository server systems. A free space available response is received from each repository server system. In the example shown, different values for the free space available command are received from each repository server system (e.g., server 1 responds that it has 1.15 TB available, server 2 responds that it has 1.25 TB available, and server 3 responds that it has 1.10 TB available). In various embodiments, the repository server systems have differing amounts of free space available because of a different hardware setup, because of a different software setup, because of a different amount of data stored, or for any other appropriate reason. In the example shown, the system for command handling determines that the server responses to the free space available command comprise different responses and that the server responses to the free space available command are not required to match. The system for command handling determines a unified response to the free space available command. In some embodiments, a unified response to a free space available command is determined by determining the minimum response (e.g., the value for which all servers have at least that much free space available). In the example shown, the command response is determined to be 1.10 TB.

Figure 5:
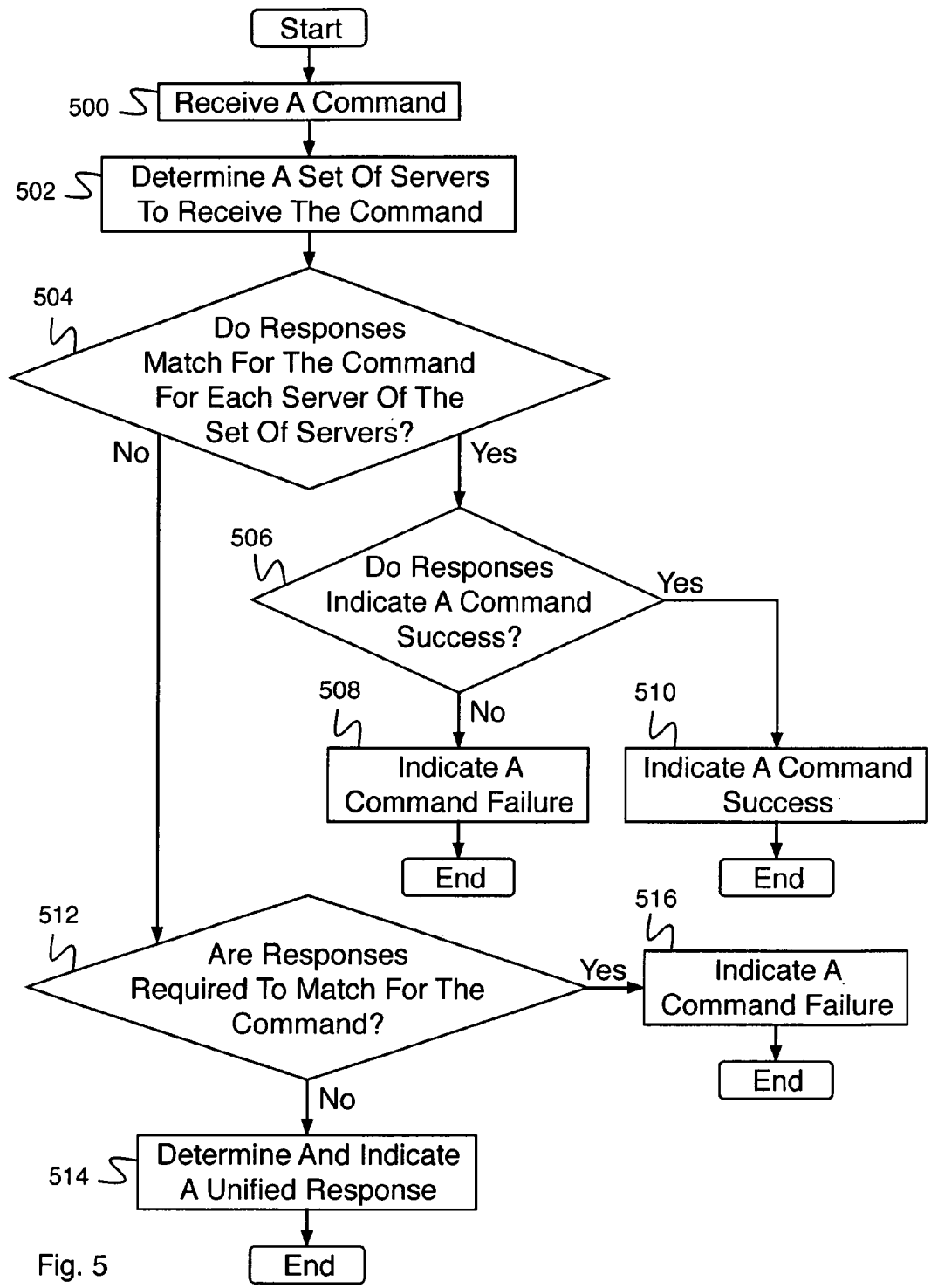
FIG. 5 is a flow diagram illustrating an embodiment of a process for command handling for replicated repositories.

FIG. 5 is a flow diagram illustrating an embodiment of a process for command handling for replicated repositories. In some embodiments, the process of FIG. 5 is executed by system for command handling 306 of FIG. 3. In the example shown, in 500, a command is received. In some embodiments, the command is provided by a user of a developer system (e.g., a developer). In some embodiments, the command comprises a repository server system command (e.g., a command for interacting with a repository server system). In various embodiments, the command comprises a read command, a write command, a delete file command, a free space available command, a current system load command, a directory contents command, a create directory command, or any other appropriate command. In 502, a set of servers to receive the command is determined. In various embodiments, the set of servers comprises one server, all servers, or any other appropriate subset of servers. In some embodiments, the command is provided to the set of servers. In some embodiments, a response is received from each server of the set of servers. In some embodiments, multiple responses are received from each server of the set of servers. In some embodiments, responses comprise a standard output stream (e.g., an output stream for providing output information), a standard error stream (e.g., an output stream for providing error information, debugging information, etc.), a plurality of streams, or any other appropriate responses. In 504, it is determined whether responses match for the command for each server of the set of servers. In the event it is determined that responses do not match for the command for each server of the set of servers, control passes to 512. In the event it is determined that responses for the command match for each server of the set of servers, control passes to 506. In some embodiments, in the event multiple responses are received for each server of the set of servers, it is determined whether responses are to match for the command separately for each response. In 506, it is determined whether responses indicate a command success. In the event it is determined that responses do not indicate a command success, control passes to 508. In the event it is determined that responses indicate a command success, control passes to 510. In 510, a command success is indicated. In some embodiments, other response data is indicated (e.g., a created file identifier, a process identifier, a time, a free space remaining, etc.). The process then ends. In 508, a command failure is indicated, and the process ends. In 512, it is determined whether responses are required to match for the command. In the event it is determined that responses are not required to match for the command, control passes to 514. In the event it is determined that responses are required to match for the command, control passes to 516. In some embodiments, in the event multiple responses are received for each server of the set of servers, it is determined whether responses are required to match for the command separately for each response. In 516, a command failure is indicated, and the process ends. In 514, a unified response is determined and indicated. In some embodiments, a unified response comprises a unified version of the set of responses that do not match. In some embodiments, the unified response is based at least in part on the command (e.g., the process for determining a unified response differs based on the command). In various embodiments, a unified response is based at least in part on a strict comparison of the responses for the command, on a fuzzy comparison of the responses for the command, on an aggregation of responses for the command, on a vote on the responses for the command, on a predetermined value, or on any other appropriate value or computation.

Figure 6:
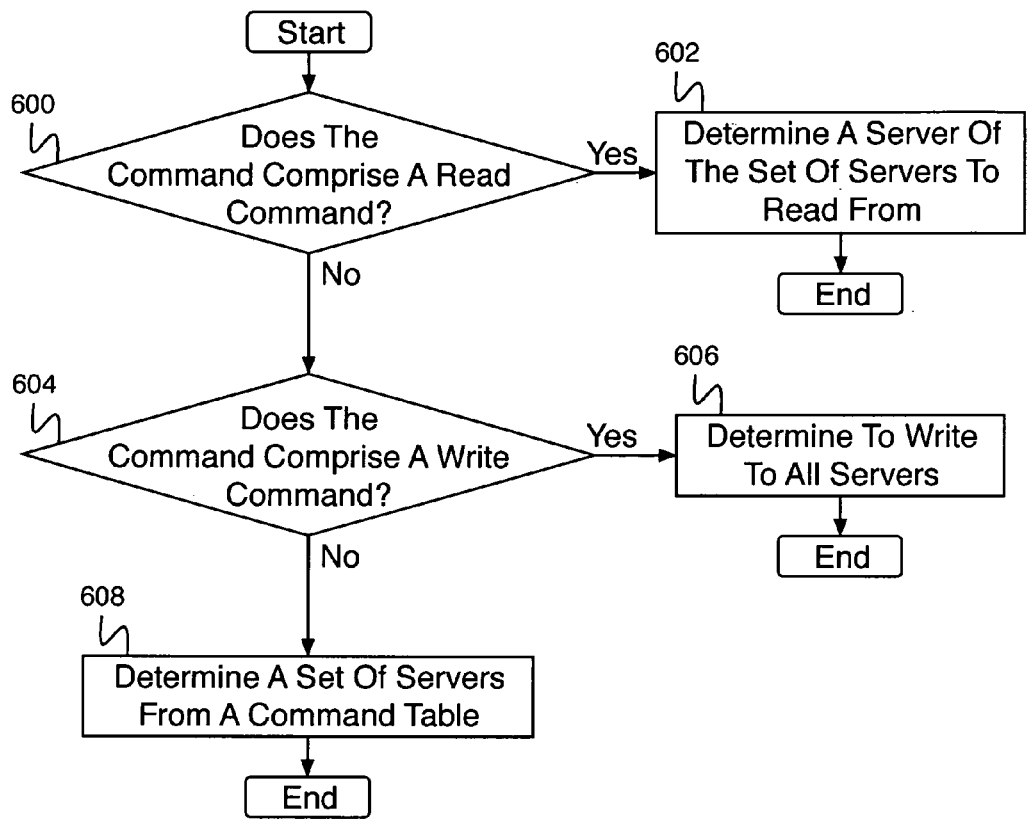
FIG. 6 is a flow diagram illustrating an embodiment of a process for determining a set of servers to receive a command.

FIG. 6 is a flow diagram illustrating an embodiment of a process for determining a set of servers to receive a command. In some embodiments, the process of FIG. 6 implements 502 of FIG. 5. In the example shown, in 600, it is determined whether the command comprises a read command. In the event it is determined that the command does not comprise a read command, control passes to 604. In the event it is determined that the command comprises a read command, control passes to 602. In 602, a server of the set of servers is determined to read from. In various embodiments, the server of the set of servers is determined using a random decision, using a round-robin decision, based on a server load, or in any other appropriate way. The process then ends. In 604, it is determined whether the command comprises a write command. In the event it is determined that the command does not comprises a write command, control passes to 608. In the event it is determined that the command comprises a write command, control passes to 606. In 606, it is determined to write to all servers, and the process ends. In 608, a set of servers is determined from a command table. In some embodiments, a command table stores a set of specific servers for a command. In some embodiments, a command table stores a number of servers for a command, and the specific servers are determined (e.g., using a random decision, using a round-robin decision, based on a server load, or in any other appropriate way).

Figure 7:
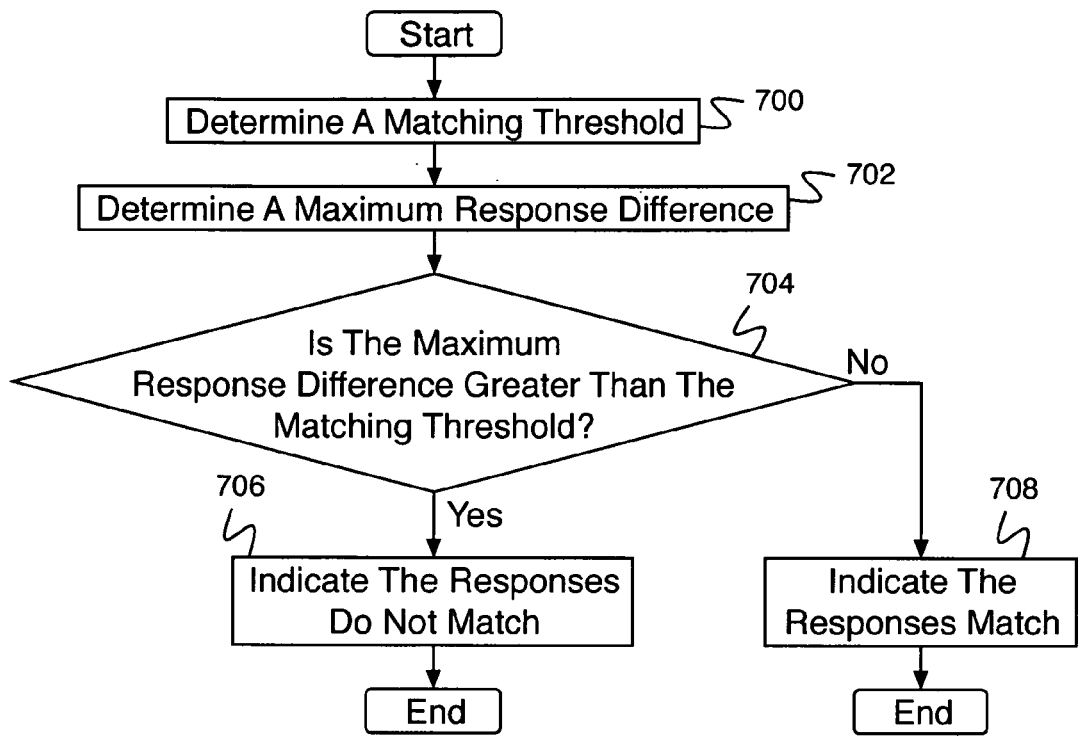
FIG. 7 is a flow diagram illustrating an embodiment of a process for determining whether responses match.

FIG. 7 is a flow diagram illustrating an embodiment of a process for determining whether responses match. In some embodiments, the process of FIG. 7 implements 504 of FIG. 5. In the example shown, in 700, a matching threshold is determined. In some embodiments, a matching threshold is determined from a command table. In various embodiments, a matching threshold comprises a fractional difference, an absolute difference, a number of non-matching characters (e.g., in a response comprising a string), or any other appropriate matching threshold type. In 702, a maximum response difference (e.g., a maximum difference in the received set of responses) is determined. In some embodiments, a maximum response difference of the same type as the matching threshold is determined (e.g., a percentage, an absolute value, a number of characters, etc.). In 704, it is determined whether the maximum response difference is greater than the matching threshold. In the event it is determined that the maximum response difference is greater than the matching threshold, control passes to 706. In the event it is determined that the maximum response difference is not greater than the matching threshold, control passes to 708. In 708, it is indicated that the responses match, and the process ends. In 706, it is indicated that the responses do not match.

Figure 8:
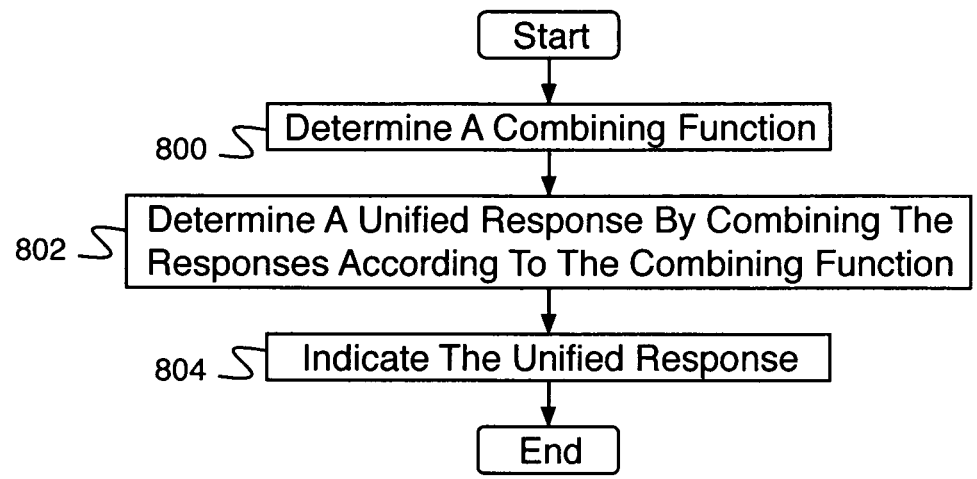
FIG. 8 is a flow diagram illustrating an embodiment of a process for determining and indicating a unified response.

FIG. 8 is a flow diagram illustrating an embodiment of a process for determining and indicating a unified response. In some embodiments, the process of FIG. 8 implements 514 of FIG. 5. In the example shown, in 800, a combining function is determined. In some embodiments, a combining function is determined based at least in part on a command (e.g., the command which the responses are responses to). In some embodiments, the combining function is determined from a command table. In various embodiments, the combining function comprises a strict comparison of the responses for the command, a fuzzy comparison of the responses for the command, an aggregation of responses for the command, a vote on the responses for the command, providing a predetermined value, or any other appropriate combining function. In 802, a unified response is determined by combining responses according to the combining function. In 804, the unified response is indicated (e.g., to the user providing the command).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for command handling for replicated repositories, comprising:
   an input interface to receive a command; and
   a processor to:
     determine a set of servers to receive the command;
     determine whether responses match for the command for each server of the set of servers; and
     in the event the responses do not match:
       determine whether the responses are required to match for the command; and
       in the event the responses are not required to match for the command:
         determine a unified response.

2. The system of claim 1, wherein the processor is further to:
   in the event the responses do not match and in the event the responses are required to match for the command:
     indicate a command failure.

3. The system of claim 1, wherein the processor is further to:
   in the event the responses match for each output:
     in the event the responses indicate a command success;
       indicate a command success.

4. The system of claim 1, wherein the processor is further to:
   in the event the responses match for each output:
     in the event the responses do not indicate a command success;
       indicate a command failure.

5. The system of claim 1, wherein the processor is further to provide the command to each server of the set of servers.

6. The system of claim 1, wherein the processor is further to receive a response to the command from each server of the set of servers.

7. The system of claim 1, wherein the unified response is based at least in part on the command.

8. The system of claim 1, wherein the unified response is based at least in part on the responses for the command.

9. The system of claim 8, wherein the unified response is based at least in part on a strict comparison of the responses for the command.

10. The system of claim 8, wherein the unified response is based at least in part on a fuzzy comparison of the responses for the command.

11. The system of claim 8, wherein the unified response is based at least in part on an aggregation of the responses for the command.

12. The system of claim 8, wherein the unified response is based at least in part on a vote on the responses for the command.

13. The system of claim 1, wherein the unified response is based at least in part on a predetermined value.

14. The system of claim 1, wherein the unified response comprises an indication of a command failure.

15. The system of claim 1, wherein the unified response comprises an indication of a command success.

16. The system of claim 1, wherein the set of servers to receive the command comprises a single server.

17. The system of claim 1, wherein the set of servers to receive the command, comprises all available servers.

18. The system of claim 1, wherein the responses comprise a standard output stream.

19. The system of claim 1, wherein the responses comprise a standard error stream.

20. The system of claim 1, wherein the responses comprise a plurality of streams.

21. A method for command handling for replicated repositories comprising:
   receiving a command;
   determining, using a processor, a set of servers to receive the command;
   determining whether responses match for the command for each server of the set of servers;

in the event the responses do not match, determining whether the responses are required to match for the command; and in the event the responses are not required to match for the command, determining a unified response.

22. A non-transitory computer readable storage medium and comprising computer instructions for: receiving a command;

determining, using a processor, a set of servers to receive the command; determining whether responses match for the command for each server of the set of servers;

in the event the responses do not match, determining whether the responses are required to match for the command; and in the event the responses are not required to match for the command, determining a unified response.

\* \* \* \* \*

UNITED STATES PATENT AND TRADEMARK OFFICE
CERTIFICATE OF CORRECTION

PATENT NO. : 9,830,147 B1
APPLICATION NO. : 14/757906
DATED : November 28, 2017
INVENTOR(S) : Patrick Reynolds It is certified that error appears in the above-identified patent and that said Letters Patent is hereby corrected as shown below:

In the Specification

In Column 2, Line 32, before "the following:", delete "AA" and insert --of--, therefor.

In the Claims

In Column 8, Claim 17, Line 54, delete "command," and insert --command--, therefor.

Signed and Sealed this
Nineteenth Day of June, 2018

Andrei Iancu
*Director of the United States Patent and Trademark Office*